(12) United States Patent
Hasegawa

(10) Patent No.: US 7,298,907 B2
(45) Date of Patent: Nov. 20, 2007

(54) TARGET RECOGNIZING DEVICE AND TARGET RECOGNIZING METHOD

(75) Inventor: Yuji Hasegawa, Fujimi (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 744 days.

(21) Appl. No.: 10/468,229

(22) PCT Filed: Feb. 13, 2002

(86) PCT No.: PCT/JP02/01199

§ 371 (c)(1),
(2), (4) Date: Aug. 18, 2003

(87) PCT Pub. No.: WO02/067199

PCT Pub. Date: Aug. 29, 2002

(65) Prior Publication Data

US 2004/0066952 A1    Apr. 8, 2004

(30) Foreign Application Priority Data

Feb. 19, 2001    (JP) ............... 2001-042299

(51) Int. Cl.
*G06K 9/62* (2006.01)
*G06K 9/00* (2006.01)
*G06K 9/68* (2006.01)

(52) U.S. Cl. ............ 382/209; 382/103; 382/107; 382/165; 382/215; 382/216; 382/217; 382/218; 382/219; 382/220; 382/221

(58) Field of Classification Search ......... 382/103, 382/107, 165, 170, 209, 215, 216, 217, 218, 382/219, 220–223

See application file for complete search history.

(56) References Cited

U.S. PATENT DOCUMENTS 5,067,014 A * 11/1991 Bergen et al. ............ 382/107

(Continued)

FOREIGN PATENT DOCUMENTS

JP    6-30417 A    2/1994
JP    6-231252 A    8/1994

OTHER PUBLICATIONS

Claims 1-3 and 7-10 are rejected under 35 U.S.C. 102(b) as being anticipated by Burt et al. "Object tracking with a moving camera", I.E.E.E. An Application of Dynamic Motion Analysis. 1989 pp. 2-12.*

*Primary Examiner*—Brian Le
(74) *Attorney, Agent, or Firm*—Birch, Stewart, Kolasch & Birch, LLP

(57) ABSTRACT

A target recognizing device that creates a template concerning a target by itself is provided. The device comprises a robot camera for creating continuous images showing a target and an arithmetic operation unit for controlling the robot camera. A robot camera acquires continuous image information by means of a camera rotatable by a motor. The arithmetic operation unit comprises a template management section for allowing an update part to update a template stored in a template storage part and a target recognition section having an image storage part where the acquired image information is stored, a recognizing part for recognizing a target by using the template, and a motion command part for rotating a camera according to the result of recognition.

7 Claims, 7 Drawing Sheets

U.S. PATENT DOCUMENTS

| | | | |
|---|---|---|---|
| 5,173,865 A * | 12/1992 | Koike et al. | 702/155 |
| 5,521,633 A * | 5/1996 | Nakajima et al. | 348/118 |
| 5,657,087 A * | 8/1997 | Jeong et al. | 375/240.16 |
| 5,796,435 A * | 8/1998 | Nonomura et al. | 375/240.03 |
| 6,130,707 A * | 10/2000 | Koller et al. | 348/155 |
| 6,130,957 A * | 10/2000 | Horikoshi et al. | 382/107 |
| 6,404,455 B1 * | 6/2002 | Ito et al. | 348/169 |
| 6,546,115 B1 * | 4/2003 | Ito et al. | 382/100 |
| 6,621,929 B1 * | 9/2003 | Lai et al. | 382/217 |
| 6,819,778 B2 * | 11/2004 | Kamei | 382/103 |

* cited by examiner

TARGET RECOGNIZING DEVICE AND TARGET RECOGNIZING METHOD

This application is the national phase under 35 U.S.C. §371 of PCT International Application No. PCT/JP02/01199 which has an International filing date of Feb. 13, 2002, which designated the United States of America.

TECHNICAL FIELD

The present invention relates to a target recognizing device and a target recognizing method for recognizing a target by using templates.

This application is based on a patent application in Japan (Japanese Patent Application No. 2001-042299), and the contents in the application in Japan are hereby incorporated as a part of this specification.

BACKGROUND ART

In conventional image recognizing devices, various sensors such as a camera are used to obtain a scene including a target, being an object to be recognized, as image information, and target recognition is conducted based on the image information and fragmentary knowledge with respect to the target. The main object of the target recognition is to grasp the scene including the target from the image information as accurately as possible, and rebuild the target. At this time, as a method for specifying the target, a template matching method is frequently used, which obtains a consistency between the target in the image information, and many templates prepared beforehand with respect to the target.

In such a conventional target recognizing device however, it is necessary to prepare many templates so that consistency with various targets can be realized, in order to correspond to various conditions. In other words, there is a problem in that before conducting the recognition processing, it is necessary to store the templates for the number of types of target, being an object to be recognized, beforehand in the target recognizing device.

When it is attempted to realize the development of an autonomously movable robot having a device which recognizes a scene including a target, and an autonomously shift device, with a conventional technique, the following method can be considered. That is to say, at first, a plurality of image information relating to a target point is stored beforehand as templates. Image information including the target point is then obtained by a camera or the like mounted therein, to extract an area having the best consistency with the template stored in advance, from the image information. The robot then moves toward the direction corresponding to the extracted area, by the autonomously shift device.

In dynamic scene analysis for analyzing the movement of a target object, by using a plurality of images continuous timewise, an optical flow is frequently used. The optical flow is a vector representation of the direction of movement at one point on the image and the magnitude of the velocity thereof. By measuring the optical flow of the target object, the movement of the target object can be recognized.

In the target recognizing device in the autonomously movable robot however, the scene photographed by a camera or the like changes moment by moment due to the movement of the robot, and even in the case of the same target, the size of the target occupying the obtained image information changes. Therefore, even by simply using the optical flow, it is difficult to perform accurate target recognition, and many templates corresponding to the respective situations become necessary.

As described above, in the conventional technique, there is a problem in that it may be difficult to perform accurate recognition processing of a target in a scene, which is changing timewise.

DISCLOSURE OF INVENTION

It is an object of the present invention to provide a target recognizing device and a target recognizing method, which can self-generate a template relating to the newest target, without requiring storage of a large amount of templates, in which the types, direction and size of the target are changed.

The first aspect of the present invention provides a device comprising a template storing device which stores a template for recognizing a target, an image acquiring device which acquires continuous images including the target, a recognition processing device which detects an optical flow between at least two images of the continuous images to obtain an evaluation function value based on the optical flow; and an update device which updates the template stored in the template storing device, based on the image including the target acquired by the image acquiring device, until the evaluation function value exceeds a predetermined value.

In the above configuration, continuous images including the target are acquired, an optical flow between at least two images of the acquired continuous images is detected, and the template is updated based on the image including the target, until the evaluation function value based on the optical flow exceeds the predetermined value. As a result, it is not necessary to store beforehand a large amount of templates in which the types, direction and size of the target are change, and a template relating to the newest target can be self-generated. Moreover, since the template is updated based on the optical flow obtained from between the respective images, a noise component other than the target can be removed. As a result, the situation can be prevented where a noise component is included in the template.

According to the second aspect of the present invention, the device further comprises a driving device which rotates the image acquiring device, and an operation instruction device which outputs an operation instruction to the driving device based on the instruction from the recognition processing device, and the operation instruction device outputs an operation instruction for stopping the rotational motion when the evaluation function value exceeds the predetermined value.

In the above configuration, the image acquiring device is rotated based on the instruction from the recognition processing device, and when a predetermined condition is satisfied, the rotational motion is stopped. As a result, the target recognizing device can perform predetermined operations such as rotating the image acquiring device in a direction of a target recognized by using templates, and shift the image acquiring device, and hence can be preferably used for controlling a robot.

According to the third aspect of the present invention, the device further comprises: a control signal receiving device which receives a control signal indicating a timing at which the template is updated; and an identification device which identifies the content of the control signal received by the control signal receiving device and informs the update device of the content, and the update device updates the template corresponding to an identification result of the control signal.

In the above configuration, since the control signal indicating the timing at which the template is updated is received, and the template is updated at the timing when the control signal is received, update of the template for recognizing the target can be performed according to an instruction from outside, and when the image acquiring device turns to an optional direction, this direction can be designated as a target direction. Moreover, since the update processing of the template for recognizing the target can be performed from the image obtained only when the image acquiring device turns to a predetermined target direction, more reliable template generation can be performed.

According to the fourth aspect of the present invention, the evaluation function value is obtained by comparing the degree of approximation of the template and the image including the target, setting a shift quantity with respect to the approximating pixel to the position in the template, and summing up shift quantities for all pixels in the whole templates.

In the above configuration, the degree of approximation of the image including the target and the template is compared, the shift quantity of the approximating pixel to the target pixel in the template is set, and the shift quantities for all pixels in the whole templates are summed up, to obtain the evaluation function value. As a result, only a characteristic point of the target is emphasized (extracted), and in the target direction, a portion, which is not stably detected, such as a characteristic point of an object existing irregularly, can be removed.

According to the fifth aspect of the present invention, there are provided at least two-types of templates for use at the time of updating while rotating in one direction, one of which is added with a positive-polarity weighting value, and another one of which is added with a negative-polarity weighting value.

In the above configuration, as the template updated at the time of rotating in the same direction, at least two templates respectively added with a positive-polarity and a negative-polarity weighting value are provided. As a result, the robustness with respect to the optical flow detected in the actual environment can be improved.

According to the sixth aspect of the present invention, a plurality of template groups is provided depending on the rotation direction of the image acquiring device.

In the above configuration, since the template group to be updated is different, depending on the rotation direction of the image acquiring device, imbalance of movement in the target direction with respect to the rotation direction of the image acquiring device can be eliminated, and the detection accuracy of the target can be improved.

The seventh aspect of the present invention provides a target identification method comprises a template storing step in which a template for recognizing a target is stored, an image acquiring step in which continuous images including the target are acquired by self-rotational motion; a recognition processing step in which an optical flow between at least two images of the continuous images is detected, to obtain an evaluation function value based on the optical flow, and an update step in which the template stored by the template storing step is updated based on an image including the target acquired by the image acquiring step, by template update timing instructed from outside, until the evaluation function value exceeds a predetermined value.

The eighth aspect of the present invention provides a computer program for target identification method to be executed by a computer, the program comprises the steps of template storage processing for storing a template for recognizing a target, image acquisition processing for acquiring continuous images including the target, recognition processing for detecting an optical flow between at least two images of the continuous images, to obtain an evaluation function value based on the optical flow, and update processing for updating the template stored by the template storage processing, based on an image including the target acquired by the image acquisition processing, until the evaluation function value exceeds a predetermined value.

According to the ninth aspect of the present invention, the image acquisition program to be executed in a computer comprises the steps of driving processing for performing self-rotational motion, and operation instruction processing for outputting operation instructions with respect to the driving processing, based on instructions from the recognition processing, are further executed by the computer, and the operation instruction processing outputs an operation instruction for stopping rotational motion at a point in time when the evaluation function value exceeds a predetermined value.

According to the tenth aspect of the present invention, the computer program for executing the target identification method in a computer comprises the steps of control signal reception processing for receiving a control signal indicating a timing at which the template is updated, and identification processing for identifying the content of the control signal received by the control signal reception processing and informing the content with respect to the update processing are further executed by the computer, wherein the update processing updates the template corresponding to an identification result of the control signal.

According to the eleventh aspect of the present invention, the target identification program comprises the steps of comparing the degree of approximation of the template and the image including the target, setting a shift quantity of the approximating pixel to the target position, and summing up the shift quantities for all pixels corresponding to all pixels of the templates.

According to the twelfth aspect the present invention, a plurality of templates are provided, which differ depending on the rotation direction of the image acquiring device.

According to the thirteenth aspect the present invention, among the plurality of templates to be updated at the time of rotating in the same direction, there are at least two types of templates, one of which is added with a positive-polarity weighting value and another one of which is added with a negative-polarity weighting value.

BEST MODE FOR CARRYING OUT THE INVENTION

Figure 1:
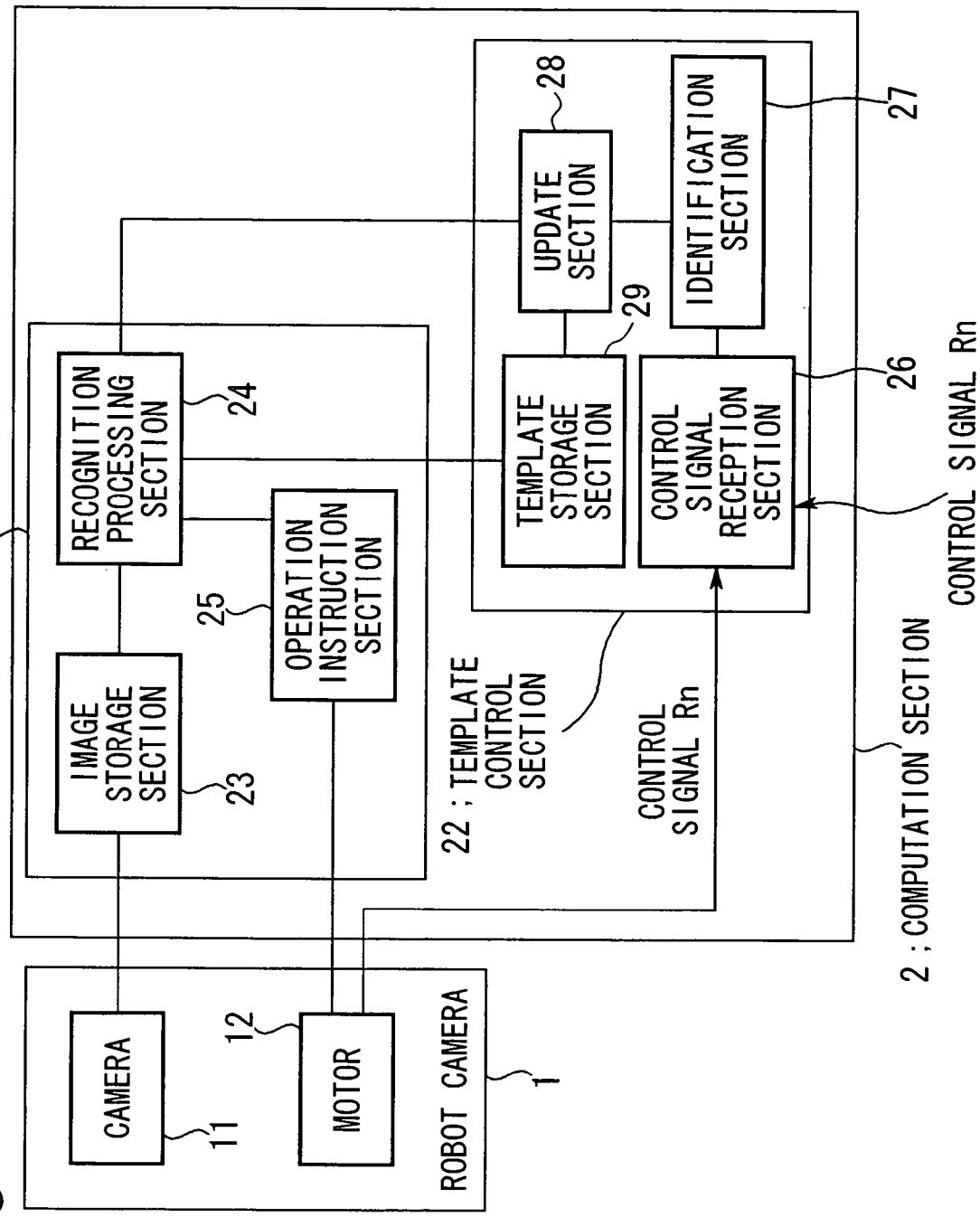
FIG. 1 is a block diagram showing the configuration of one embodiment of the present invention.

The target recognizing device according to one embodiment of the present invention will be described, with reference to the drawings. FIG. 1 is a block diagram showing the configuration of this embodiment. Reference symbol 1 denotes a robot camera comprising a camera 11 (for example, a CCD camera) for acquiring peripheral images, and a motor 12 for rotating the camera 11 in the horizontal direction to direct the optical axis of the camera 11 to an optional direction. The motor 12 is provided with an encoder (not shown), so that the direction (angle of rotation) of the camera 11 at the time of rotational motion can be detected by a value of the encoder. Reference symbol 2 denotes an arithmetic operation section, which comprises a target recognition section 21 and a template control section 22. Reference symbol 23 denotes an image storage section for storing images taken by the camera 11, and images stored herein are sampled and quantized images. Reference symbol 24 denotes a recognition processing section for recognizing a target based on the image stored in the image storage section 23. Reference symbol 25 denotes an operation instruction section for outputting operation instructions to the robot camera 1, based on the target recognition result in the recognition processing section 24. Reference symbol 26 denotes a control signal reception section for receiving a control signal Rn transmitted from outside or from the robot camera 1. Reference symbol 27 denotes an identification section for identifying the control signal Rn and issuing an instruction based on the identification result. Reference symbol 28 denotes an update section for updating a template stored in a template storage section 29.

The outline of the operation of the target recognizing device will be described, with reference to FIG. 1. n pieces (n is a natural number) of templates Mn are stored in advance in the template storage section 29 in the template control section 22.

The camera 11 provided in the robot camera 1 takes images of the external environment as seen from the robot camera 1 continuously, and the image information is sequentially stored in the image storage section 23 in the target recognition section 21. The recognition processing section 24 in the target recognition section 21 calculates the optical flow between the continuous images taken out from the image storage section 23, and changes in the operation are obtained for each local portion in the image to extract a characteristic portion in the image. The recognition processing section 24 searches the template Mn corresponding to the input image in the template storage section 29, to perform recognition processing of a target in the external environment. The processing result in the recognition processing section 24 is provided to the operation instruction section 25. Upon reception of the processing result, the operation instruction section 25 provides an operation instruction corresponding to the processing result in the recognition processing section 24, to the motor 12 in the robot camera 1. The motor 12 generates a driving force corresponding to the operation instruction, to thereby cause spontaneous rotational motion of the camera 11.

On the other hand, the templates Mn stored in the template storage section 29 are updated as required. Update of the templates Mn is performed corresponding to a control signal Rn provided from outside of the target recognizing device, or a control signal Rn transmitted from the robot camera 1 at the timing when the camera turns to a direction including the target. The control signal Rn is received by the control signal reception section 26, and the content thereof is identified by the identification section 27. The identification section 27 provides an update instruction corresponding to the identification result, to the update section 28. The update section 28 updates the corresponding template Mn based on the received update instruction.

Figure 2:
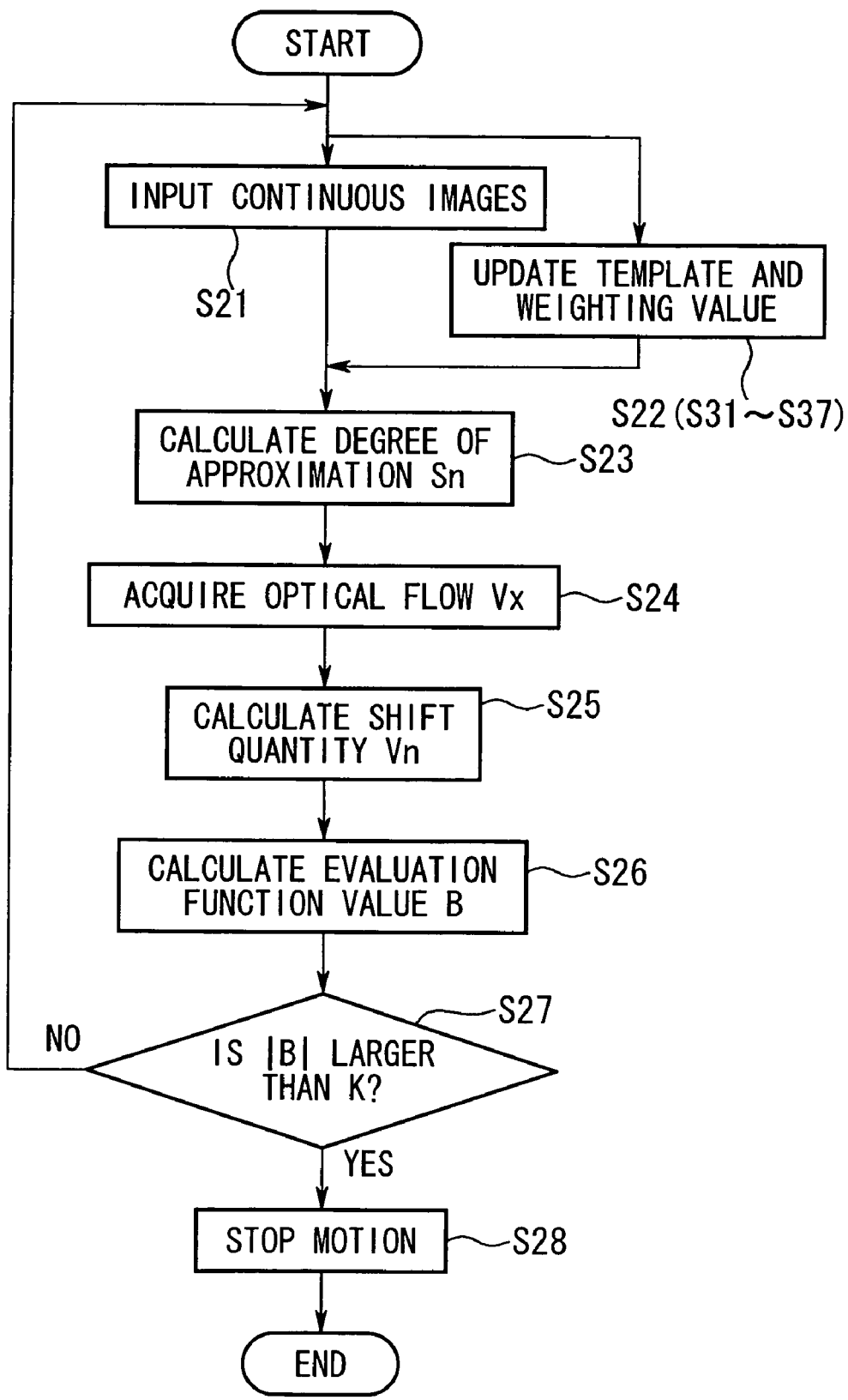
FIG. 2 is a flowchart showing the operation of a target recognizing device shown in FIG. 1.
Figure 3:
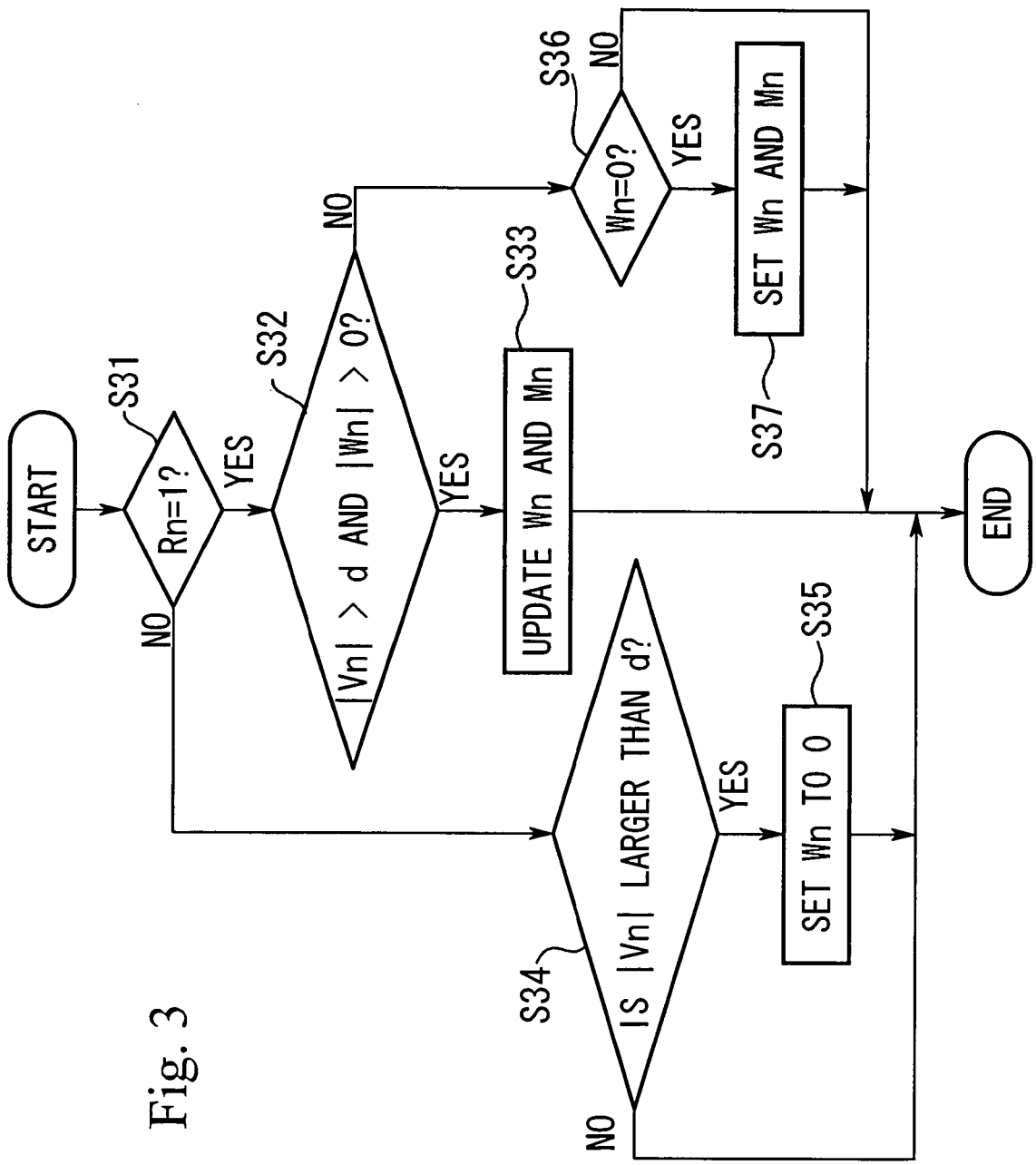
FIG. 3 is a flowchart showing the operation of update processing for templates and weighting shown in FIG. 2.

The operation of the target recognizing device will be described in detail, with reference to FIGS. 2 and 3. FIG. 2 is a flowchart showing the operation for creating the template Mn corresponding to the image including a target. FIG. 3 is a flowchart showing the operation in step S22 shown in FIG. 2. At first, the operation instruction section 25 issues an instruction for performing rotational motion, to the motor 12. Upon reception of the instruction, the motor 12 drives, to rotate the camera 11 about an axis perpendicular to the ground.

Figure 4:
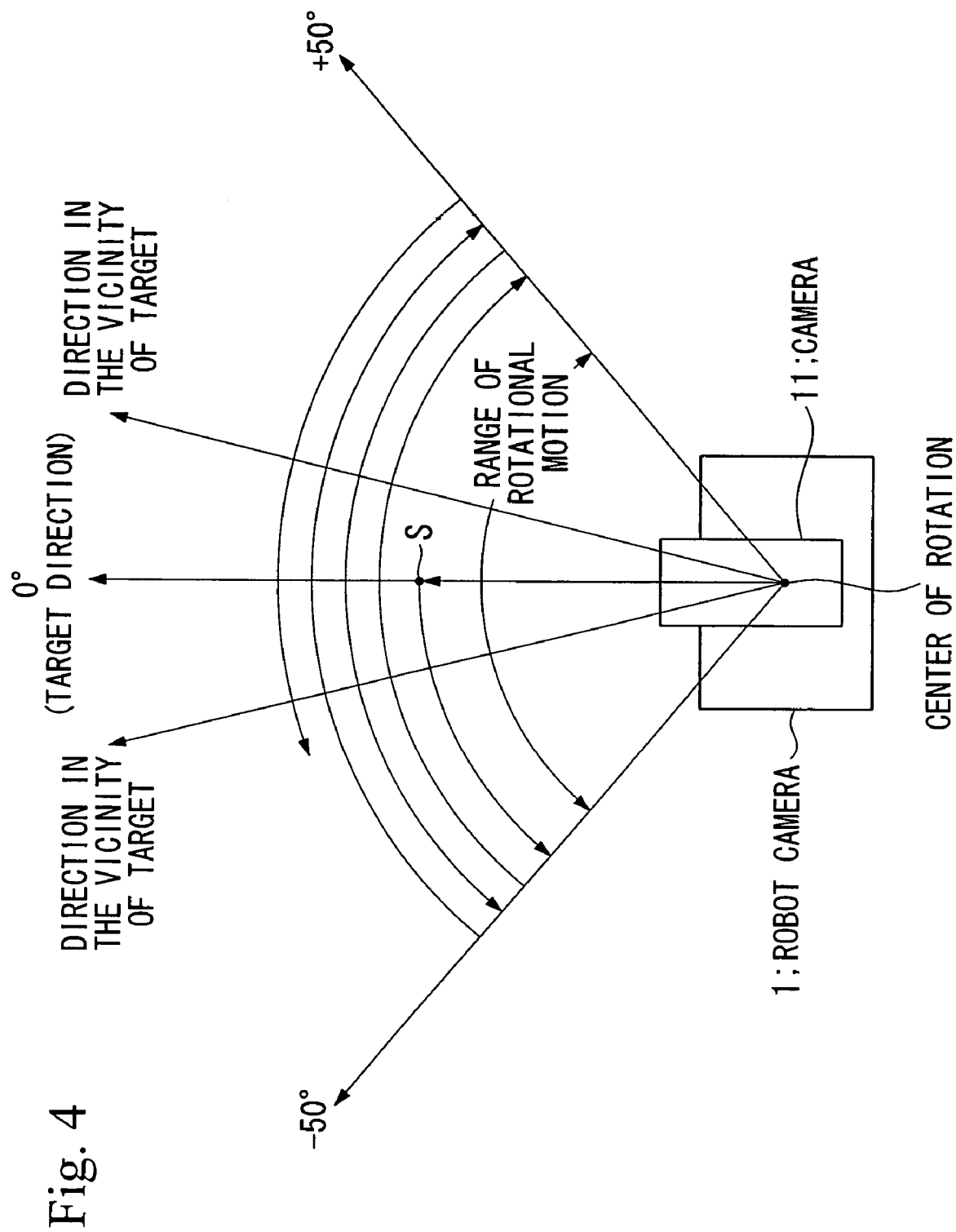
FIG. 4 is a diagram showing the operation of a camera 11.

The rotation operation of the camera 11 will be described here. FIG. 4 is a diagram of the robot camera 1 as seen from the above. Though the computation section 2 is not shown in FIG. 4, the computation section 2 is installed in the vicinity of the robot camera 1. As shown in this figure, the camera 11 performs reciprocating rotational motion within the range of rotational motion of from −50° to 50°, due to driving of the motor 12. At this time, before starting the rotational motion, the direction to which the optical axis of the camera 11 is directed is assumed to be 0°. This direction of 0° is the direction where the target exists (target direction). In this processing, the image in the target direction is acquired, and a template corresponding to the acquired image is created. In this embodiment, the camera 11 is rotated to obtain the optical flow from, the image in the vicinity of the target direction and the image in the target direction, which is then used for creating and updating the template.

When the image in the target direction and the image in the vicinity of the target direction are acquired, it can also be considered to simply rotate the camera in the vicinity of the target direction, but in order to create a better template relating to the image in the vicinity of the target direction, it is necessary to take pictures of the image repetitively. Therefore, in order to obtain stable images at the time of rotational motion of the camera in the vicinity of the target direction, the range of rotational motion is designated as up to 50° right and left. The encoder provided in the motor 12 outputs "1" as the control signal Rn, when the angle of rotation is 0°. This control signal Rn is received by the control signal reception section 26. By receiving this control signal Rn, the computation section 2 can detect that the camera 11 has turned to the target direction, and creates and updates the template Mn, by using the image at this timing.

In FIG. 4, the camera 11 acquires an image in the direction of 0° (target direction) indicated by reference symbol S. The camera 11 then rotates to the direction of −50° and returns to the direction of 0°. At this time, the camera 11 acquires images at a certain sampling interval. Further, the camera 11 rotates to the direction of +50° and returns to the direction of 0°. Also at this time, the camera 11 acquires images at a certain sampling interval. The optical flow is calculated from a series of continuous images obtained here.

The images acquired by the camera 11 are sequentially stored in the image storage section in the computation section 2 (step S21 in FIG. 2). The stored image is described here as an image It(x, y). Each pixel in the image It(x, y) is expressed by a gray value of 8 bits (256 gradations).

In parallel with the operation for storing the images, the update section 28 updates the template Mn and the weighting value Wn (step S22). Details of the processing in step S22 will be described later.

Figure 5:
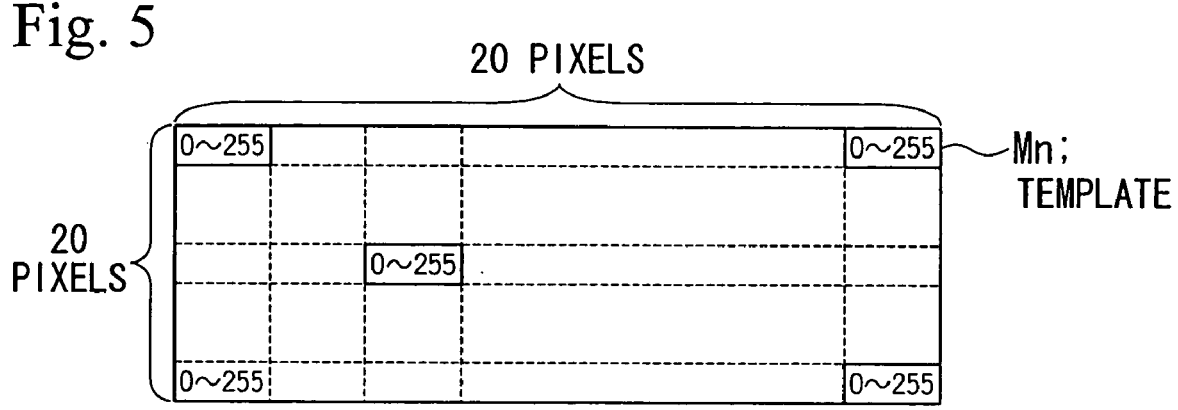
FIG. 5 is a diagram showing constitution of a template.
Figure 6:
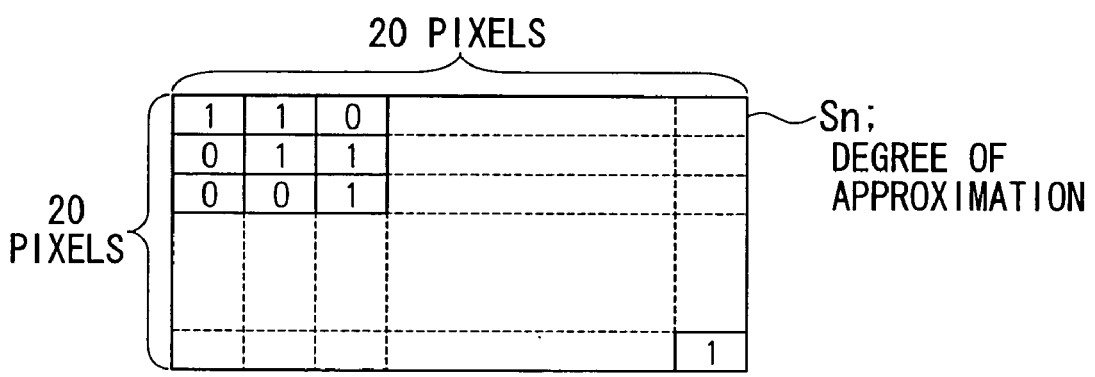
FIG. 6 is a diagram showing the constitution of the degree of approximation

The recognition processing section 24 then calculates the degree of approximation Sn(x, y) between the newest image It(x, y) stored in the image storage section 23 and each pixel in the n templates Mn held in the recognition processing section 24 beforehand (step S23). The operation for calculating the degree of approximation Sn(x, y) will be described here, with reference to FIGS. 5 and 6. FIG. 5 is a diagram showing one template Mn representing the templates Mn, which are previously stored. FIG. 6 is a diagram showing the degree of approximation Sn for each pixel obtained by the processing in step S23.

As shown in FIG. 5, each template Mn is constituted of 20×20 pieces of pixels, and the position of each pixel is expressed by the coordinates (x, y). The gray value of each pixel in all templates Mn in the initial state is set to any value of 256 gradations (0 to 255) at random. The construction may be such that the template storage section 29 stores a transform value for each of the 20×20 pixels, by using a Fourier transform, a Gabor transform or a Wavelet transform, instead of the gray value.

The template Mn can correspond to an optional position on the input image It acquired by the camera 11. For example, if the pixel It(0, 0) at the upper left of the input image It is made to agree with the pixel Mn(0, 0) at the upper left of the template Mn, the image recognition for 20×20 pixels at the upper left of the input image It is carried out, by using the template Mn.

In the embodiment described later, an experiment was carried out for setting such that the center of the input image It agrees with the center of the template Mn, but the template Mn may be used for the other areas of the input image It.

The degree of approximation Sn can be obtained by performing for each pixel, processing where the newest image It(x, y) stored in the image storage section 23 is compared with the template Mn(x, y) stored in the template storage section 29 for each pixel to obtain a difference in the gray value, and if the difference is smaller than a predetermined value, it is assumed that the image It(x, y) approximates to the template Mn(x, y), and if the difference is larger than the predetermined value, it is assumed that the image It(x, y) does not approximate to the template Mn(x, y). In other words, a difference Dn(x, y) between the gray value Mn(x, y) of the template and the gray value It(x, y) of the input image is calculated as follows:

$$Dn(x, y) = |Mn(x, y) - It(x, y)| \quad (1).$$

If Dn(x, y) is smaller than the predetermined threshold Gn, it is assumed that the degree of approximation Sn=1, and if Dn(x, y) is not smaller than Gn, it is assumed that the degree of approximation Sn=0. By this processing, as a result of comparison of the input image It with the template Mn, "1" is set to only the approximating pixels.

The recognition processing section 24 calculates the optical flow by using an input image It−1(x, y) obtained immediately before the newest input image It(x, y), and the input image It(x, y), to obtain the optical flow Vx (step S24). The optical flow is calculated by the following equation (2):

$$\partial x Vx(x, y) + \partial y Vy(x, y) + \partial t = 0 \quad (2).$$

Since the camera 11 performs only the right and left rotational motion, then in the optical flow, only the x component is used, and Vx(x, y) obtained by the equation (2) is designated as the optical flow.

The recognition processing section 24 calculates a local shift quantity Vn from the obtained optical flow Vx(x, y), using the following equation (3) (step S25):

$$Vn(x, y) = Sn(x, y) \cdot Vx(x, y) \quad (3).$$

Figure 7:
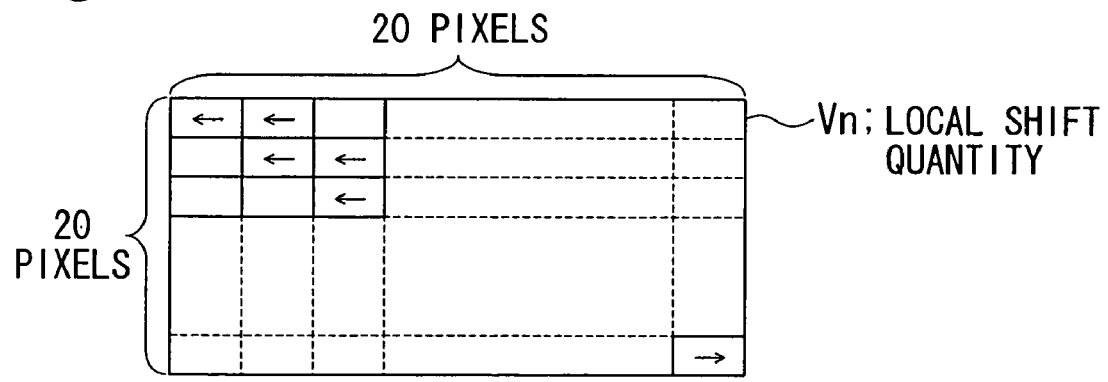
FIG. 7 is a diagram showing the constitution of a local shift quantity.

This reflects the optical flow value, with respect to only the pixel having the degree of approximation Sn=1. The result of the obtained local shift quantity Vn is shown in FIG. 7.

The recognition processing section 24 calculates the evaluation function value B by the following equation (4) (step S26):

$$B = \sum_n \alpha n \sum_x \sum_y Wn(x, y) Vn(x, y) \quad (4)$$

where, Wn(x, y) is a weighting value with respect to the pixel, which can take a positive or negative value, and αn is a weighting value for each template in a range of 0<αn≦1. This Wn(x, y) is a value obtained in step S22. The processing in step S26 means to sum up values including the respective weighting portions for all pixels of all templates. In other words, with an increase in the number of pixels having a large weighting value Wn and a degree of approximation Sn=1, the evaluation function value B increases.

The recognition processing section 24 determines whether the absolute value of the obtained evaluation function value B is larger than a predetermined threshold k (step S27). As a result of this determination, if the evaluation function value B is not larger than the threshold k, control returns to step S21 and step S22, to repeat the processing. On the other hand, if the evaluation function value B is larger than the threshold k, the recognition processing section 24 informs the operation instruction section 25 that the template creation processing has finished. In response to this, the operation instruction section 25 issues an instruction for stopping the drive of the motor 12 to the motor 12. As a result, the rotational motion of the camera 11 stops, with the camera 11 turning to the target direction (step S28).

As a result, the template Mn corresponding to the image in the target direction is complete, thereby enabling the target recognition processing using this template Mn.

If the threshold k is set to a very low value, the evaluation function value B is likely to exceed the threshold k. Therefore, the camera 11 can be quickly located at a position, which is considered to be the target direction. However, if the threshold k is set to a value too low, there is the possibility that the camera 11 is located erroneously in a direction where image information similar to the target direction is obtained. On the contrary, if the threshold k is set to a value too high, the camera 11 is reliably located in the true target direction, but it takes too much time. Moreover, if the rotational speed of the camera 11 is too fast as compared with the number of pixels in the template Mn, since the change in the evaluation function value B corresponding to the rotation of the camera 11 becomes large, there is the possibility that the camera 11 is stopped with the camera 11 turning to an inadequate direction.

Therefore, it is desired to appropriately set the threshold k corresponding to various parameters, such as the complexity of the environment where the robot camera 1 is placed, the recognition accuracy required for the target recognizing device and the time required for recognition, the processing capability of the computation section 2, the number of pixels in the template Mn and the number of templates Mn, and the rotational speed of the camera 11.

Moreover, when |B|>k is not satisfied, even if the processing of from steps S21 to S27 is repeated, after the processing is performed for a predetermined number of times, or after a predetermined period of time, the largest value of |B| may be detected, so that the camera 11 is stopped, directed in that direction.

The update processing for the template Mn and the weighting value Wn shown in step S22 in FIG. 2 will be described, with reference to FIGS. 3 and 8. FIG. 3 is a flowchart showing the operation of the update processing for the template Mn and the weighting value Wn. At first, the identification section 27 determines whether the control signal Rn is "1" (ON) (step S31). This control signal Rn is such a signal that when the camera 11 turns to the target direction (the direction of 0° shown in FIG. 4), "1" is output. As a result of the determination, if the control signal Rn is not "1", it is determined whether |Vn|>d (step S34), wherein d denotes a preset threshold. As a result of the determination, if |Vn| is not larger than d, the control signal Rn "1" has not been input, and the camera 11 should not turn to the target direction. Therefore, the update processing for the template and the like is not executed, and the processing finishes. If |Vn|>d, the update section 28 sets the weighting value Wn to "0" (step S35). This processing means that a pixel having the size of Vn larger than the predetermined value, though the control signal Rn "1" has not been input, is regarded as noise as a result of having caught an object other than the target, and the record of this portion is cancelled (deleted) by designating the weighting value Wn as "0", so that the update processing for the template and the like is not executed.

On the other hand, in step S31, when the control signal Rn is "1", the update section 28 determines whether |Vn|>d, and Wn>0 (step S32). As a result of the determination, if |Vn|>d, and Wn>0, the update section 28 updates the template Mn and the weighting value Wn (step S33), to finish the processing. The respective update is performed according to the following equations (5) and (6).

$$Wn(x, y)=Wn(x, y)+w \quad (5)$$

where w denotes an initial value of the weighting value.

$$Mn(x, y)=Mn-q(Mn-It) \quad (6)$$

where q denotes a fixed value set to any figure in the range of $0<q\leqq 1$

In other words, as the pixel in the template Mn becomes closer to the input image It, the initial value w is added to the weighting value Wn to increase the weighting, so that the template Mn is brought close to the gray value of the pixel in the input image It. As a result, while the camera 11 performs the rotational motion repetitively, the characteristic point of the target is emphasized (extracted) in the input image It, and the portion which is not detected stably in the target direction, such as a characteristic point of an object existing irregularly, is cut out.

On the other hand, in step S32, if |Vn| is not larger than d, or Wn is not larger than 0, the update section 28 determines whether the weighting value Wn is "0" (step S36). As a result of the determination, if Wn is not 0, the processing finishes. On the other hand, when Wn=0, the update section 28 sets the template Mn and the weighting value Wn (step S37). This processing is performed even if the target may have been caught, but since the weighting value Wn is still 0, it is determined that the image of this portion is obtained for the first time, and Wn is set to w (initial value), and the pixel is set to a gray value of a corresponding pixel in the input image It.

Figure 8:
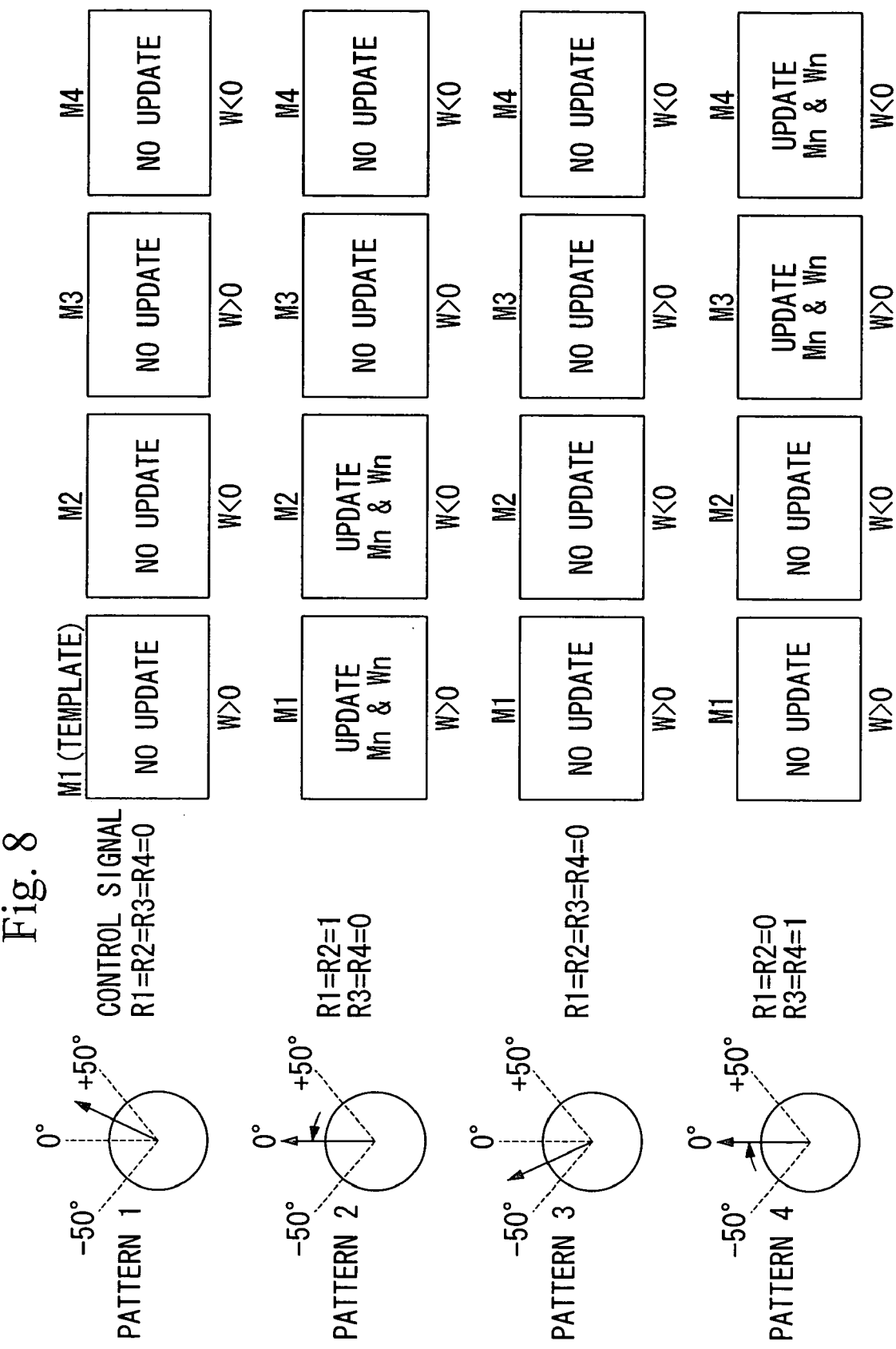
FIG. 8 is a diagram showing the update operation for templates and weighting values.

FIG. 8 is a diagram for explaining the update processing for the template Mn and the weighting value Wn. In FIG. 8, there is shown a case where the templates Mn are four (M1 to M4). The control signal Rn is provided for updating the template Mn of a corresponding sign. For example, when a control signal R1=1 is given, the template M1 is updated.

In FIG. 8, patterns 1 and 3 show the state where the camera 11 is not directed to the target direction (direction of 0°). At this time, the control signal Rn is R1=R2=R3=R4=0, and corresponds to a case of "NO" in step S31 shown in FIG. 3. Patterns 2 and 4 show the state where the camera 11 is directed to the target direction (direction of 0°). At this time, the control signal Rn is R1=R2=1, or R3=R4=1, and corresponds to a case of "YES" in step S31 shown in FIG. 3.

In pattern 2 in FIG. 8, the templates M1 and M2 are updated, but weighting values W1 and W2 with polarities opposite to each other are provided. Similarly, in pattern 4, the templates M3 and M4 are updated, but weighting values W3 and W4 with polarities opposite to each other are provided. This is for improving the robustness with respect to the optical flow by means of an object detected in the actual environment. For example, in the actual environment, the boundary portion of an object is likely to be detected as an optical flow in a direction opposite to that of the face portion, and the detection result is unstable. Therefore, in order to improve the detection accuracy as a whole, weighting values Wn having opposite polarities are used to clarify the boundary portion.

As shown in FIG. 8, the updated templates Mn are grouped (into M1 and M2, or M3 and M4) according to a case where the camera 11 reaches the direction of 0° (target direction) counterclockwise (pattern 2), and a case where the camera 11 reaches the direction of 0° (target direction) clockwise (pattern 4). This is for coping with the imbalance of the movement in the target direction with respect to the movement of the camera 11. Normally, it is rare that an object existing in the target direction has a completely symmetric shape or pattern, and the way of generating the optical flow is different in the counterclockwise rotation and the clockwise rotation. In the present invention, in order to correspond to the imbalance and to improve the detection accuracy, the templates Mn are grouped for each direction of rotation. In other words, the characteristic of the optical flow generated by an object existing in the target direction, when the camera 11 is rotated counterclockwise, is reflected in the templates M1 and M2, and the characteristic of the optical flow generated by the object existing in the target direction, when the camera 11 is rotated clockwise, is reflected in the templates M3 and M4.

The camera 11 may be set so as to continue to rotate in either one direction. In this case, a target recognizing device needs only to record and hold the templates M1 and M2, or the templates M3 and M4.

When the camera 11 is to be stopped, there is the possibility that the camera 11 is stopped in the state of being displaced too much and shifted from the target direction or the target position due to the influence of inertia. Therefore, the construction may be such that a stopping instruction is issued before the target direction (0°) by a predetermined angle, or the camera 11 is made to return by a predetermined angle and stop reliably, with the camera facing the target direction. Moreover, the angle of rotation of the camera 11 is not limited to ±50°, and other angles may be employed. The update processing for the templates Mn and the like may be performed at an angle other than 0°, for example, at a point in time when the camera 11 turns to a direction where a pixel or pattern having a particular density exists.

By the above described processing operation, the template used for recognizing a predetermined target is complete, and stored in the template storage section 29.

Figure 9:
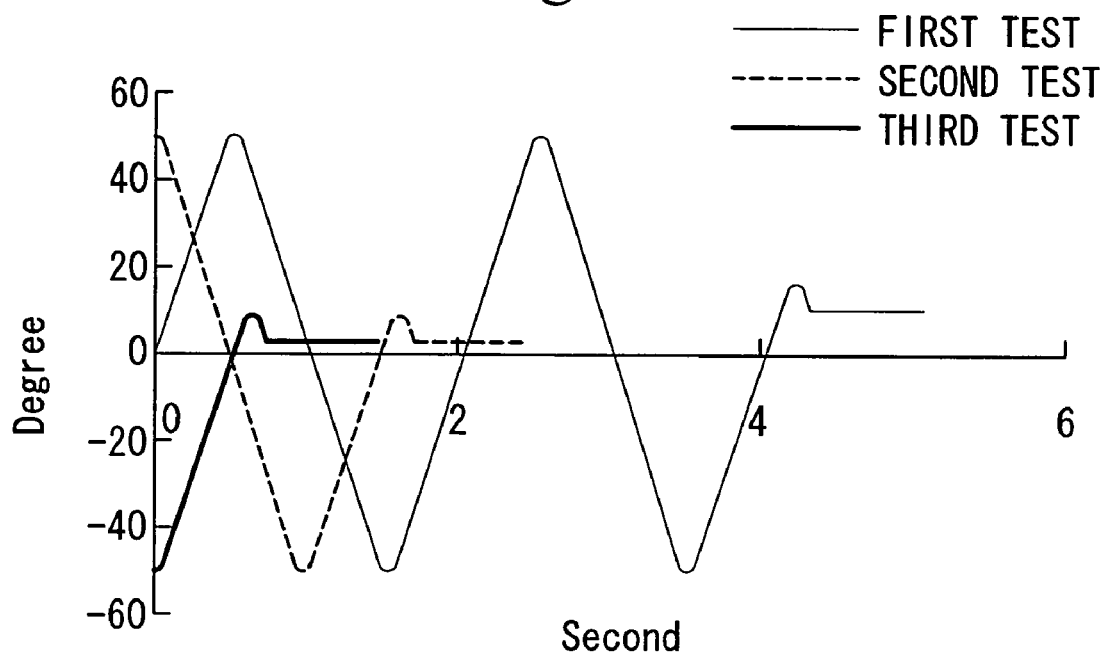
FIG. 9 is a diagram showing tracks of a camera 11 in an embodiment.

The results of tests conducted for preparing the template by the above described operation will now be described. FIG. 9 is a diagram showing tracks of the direction of the camera 11. As shown in FIG. 9, in the first test, when in total four control signals Rn were provided, the above described at-end condition was satisfied and the test finished. In other words, it is shown that when the fourth control signal Rn is provided, the template Mn(x, y) having had a random value becomes a sufficient value for recognizing the target in the direction of 0°.

The second test was conducted by using the template Mn(x,y) obtained as a result of the first test. In the second test, when the camera 11 was turned from the direction of +50° to the direction of 0°, as in the first test, the control signal Rn was provided. In this case, the test finished by providing two control signals Rn. In other words, the initial value was different from that of the first test, corresponding to the target. As a result, it is seen that the number of control signals Rn provided for generating the template used for the target recognition can be reduced.

In the third test, the template obtained as a result of the second test was used, to start the test from the state where the camera 11 was directed in the direction of −50°. In this case, the at-end condition was satisfied by only providing a first control signal. In other words, it is seen that the template required for recognizing the target has been nearly completed from the initial stage.

As shown in FIG. 9, it is seen that by repeating the template update processing, the template is updated to one sufficient for recognizing the target, and the camera is located in the vicinity of 0° in the target direction at an early stage.

Figure 10:
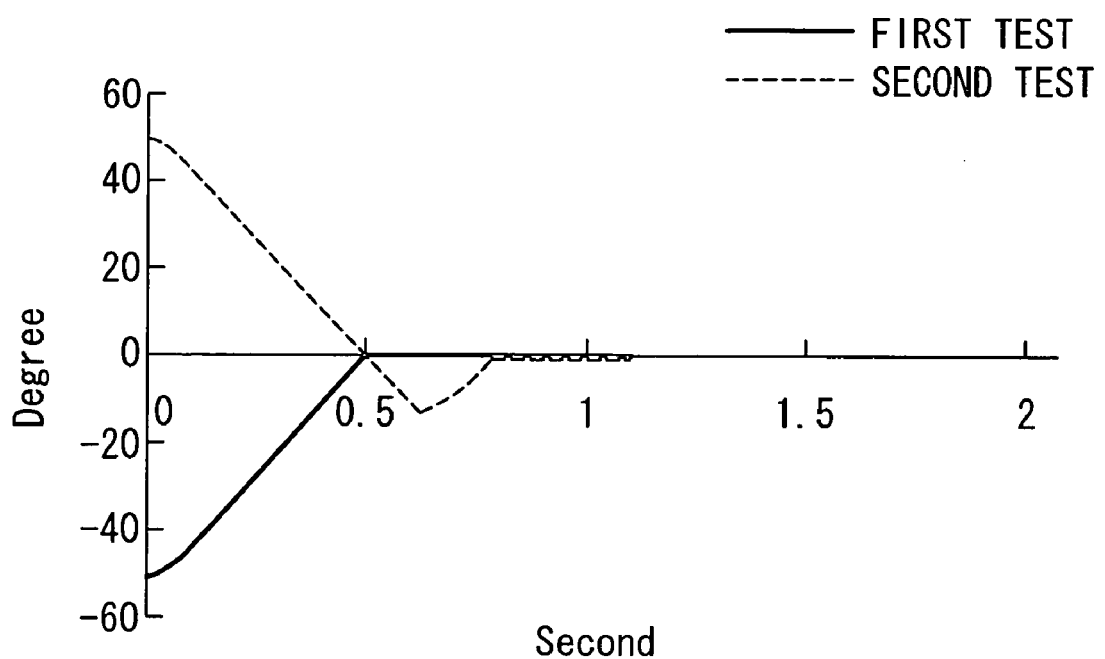
FIG. 10 is a diagram showing a track of the direction of the camera 11, when the target recognition processing is executed by using sufficient templates for recognizing the target in the above embodiment.

The test results of the target recognition processing using the complete template in the target recognizing device will be described. FIG. 10 is a diagram showing a track of the direction of the camera 11, when the target recognition processing is performed by using a template sufficient for recognizing the target, obtained by repeating the template update processing. As shown in FIG. 10, it is seen that even if the direction to which the camera 11 is made to turn at first is counterclockwise, or clockwise, the target is recognized quickly in substantially the same time, and the camera 11 is located in the target direction.

The robot camera 1 and the computation section 2 may be connected by wire, but a radio communication apparatus may be provided, and the information exchanged by using radio communication. The robot camera 1 and the computation section 2 may be integrated.

Furthermore, when a control signal Rn is transmitted from outside to the control signal reception section 26, the output timing of the control signal Rn may be determined by an operator, every time the camera 11 turns to the target direction.

Moreover, a program for realizing the function of each block shown in FIG. 1 may be recorded in a computer readable recording medium, and the program recorded in the recording medium may be read into a computer system, and executed, to conduct the template update processing and the target recognition processing. The "computer system" referred to herein includes OS and hardware such as peripheral equipment. The "computer readable recording medium" stands for portable media such as flexible disks, magneto-optical disks, ROM and CD-ROM, and memories such as hard disks built into the computer system. The "computer readable recording medium" further includes one holding the program for a certain period of time, such as a volatile memory (RAM) within the computer system, which becomes a server or a client, when the program is transmitted via a network such as the Internet or a communication circuit such as telephone lines.

The program may be transmitted from the computer system, which stores the program in a memory or the like, to other computer systems via a transmission medium, or by transmitted waves in the transmission medium. The "transmission medium" for transmitting the program stands for a medium having a function of transmitting the information like a network (communication network) such as the Internet, or a communication circuit (communication line) such as telephone lines. The program may be for realizing a part of the above described function. Moreover, the program may be a so-called differential file (differential program) which can realize the above described function by a combination with a program already recorded in the computer system.

As described above, the target recognizing device of the present invention comprises: a template storing device which stores a template for recognizing a target; an image acquiring device which acquires continuous images including the target; a recognition processing device which detects an optical flow between at least two images of the continuous images, to obtain an evaluation function value based on the optical flow; and an update device which updates the template stored in the template storing device, based on the image including the target acquired by the image acquiring device, until the evaluation function value exceeds a predetermined value. As a result, it is not necessary to store a large amount of templates beforehand, in which the types, direction and size of targets are changed, and a template relating to the newest target can be self-generated.

The target recognizing device of the present invention can perform predetermined operations, such as rotating the camera in a direction of a target recognized by using the template, and shift the camera. Hence, the target recognizing device of the present invention is suitable for controlling a robot.

The invention claimed is:

1. A target recognizing device comprising:
an image acquiring device which acquires images including a target, while performing rotational movement;
a driving device which rotates the image acquiring device;
a template storing device which stores a template used for recognizing the target, the template including a plurality of pixels each having a pixel-gradation value and a weighting value;
a template updating device which updates the template by updating the pixel-gradation value and the weighting value, when the image acquiring device directs a predetermined direction, or in accordance with a control signal input from outside;

a recognition processing device which compares a newly obtained image and an updated template for each pixels, and calculates the pixel-gradation value that can be obtained for each pixels, and an evaluation function value based on an optical flow; and an operation instruction device which outputs an operation instruction to the driving device in accordance with the direction of the image acquiring device and the evaluation function value, wherein the recognition processing device calculates:

a degree of approximation of the each pixels by comparing the pixel-gradation value of the each pixels of the images of the pixel-gradation value of the corresponding pixels of the template;

the optical flow of the pixels based on the continuous images, a local shift quantity of the each pixels by multiplying the degree of approximation by the optical flow; and the evaluation function value by summing up all values obtained by multiplying the local shift quantity and the weighting value for the each pixels.

2. The target recognizing device according to claim 1, wherein the target recognizing device comprises a group of templates for images acquired while rotating the image acquiring device; and the group of template is updated according to the rotation direction of the image acquiring device.

3. The target recognizing device according to claim 2, wherein the group of templates which are updated while rotating in the same direction comprises at least two types of templates; and one of which is added with a positive-polarity weighting value, while the other one of which is added with a negative-polarity weighting value.

4. A target recognition program stored in a computer-readable medium, for executing in a computer comprising:

a driving process of rotating an image acquiring device which acquires images including a target while performing rotational movement;

a template storing process of storing a template used for recognizing the target, the template including a plurality of pixels each having a pixel-gradation value and a weighting value;

a template updating process of updating the template by updating the pixel-gradation value and the weighting value, when the image acquiring device directs a predetermined direction, or in accordance with a control signal input from outside;

a recognition process of comparing a newly obtained image and an updated template for each pixels, and calculating the pixel-gradation value for the each pixels, and an evaluation function value based on an optical flow; and an operation instruction process of outputting an operation instruction to the driving device in accordance with the direction of the image acquiring device and the evaluation function value, wherein in the recognition process a degree of approximation of the each pixels is calculated by comparing the pixel-gradation value of the each pixels of the images and the pixel-gradation value of the corresponding pixels of the template, the optical flow of the pixels is calculated based on the continuous images, a local shift quantity of the each pixels is calculated by multiplying the degree of approximation by the optical flow, and the evaluation function value is calculated by summing up all values obtained by multiplying the local shift quantity and the weighting value of the each pixels.

5. The target recognition program stored in a computer-readable medium, according to claim 4, wherein a plurality of template groups are provided for use in updating templates according to the rotation directions at the time of image acquiring processing.

6. The target recognition program stored in a computer-readable medium, according to claim 5, wherein the plurality of templates to be updated at the time of rotating in the same direction include at least two templates, and one of which is added with a positive-polarity weighting value while the other one of which is added with a negative-polarity weighting value.

7. A target recognizing method comprising:

a driving step of rotating an image acquiring device which acquires images including a target while performing rotational movement;

a template storing step of storing a template used for recognizing the target, the template including a plurality of pixels each having a pixel-gradation value and a weighting value;

a template updating step of updating the template by updating the pixel-gradation value and the weighting value, when the image acquiring device directs a predetermined direction, or in accordance with a control signal input from outside;

a recognition processing step of comparing a newly obtained image and an updated template for each pixels, and calculates the pixel-gradation value for the each pixels, and an evaluation function value based on an optical flow; and an operation instruction step of outputting an operation instruction to the driving device in accordance with the direction of the image acquiring device and the evaluation function value, wherein in the recognition processing step, a degree of approximation of the each pixels is calculated by comparing the pixel-gradation value of the each pixels of the images and the pixel-gradation value of the corresponding pixels of the template, the optical flow of the pixels is calculated based on the continuous images, a local shift quantity of the each pixels is calculated by multiplying the degree of approximation by the optical flow, and the evaluation function value is calculated by summing up all values obtained by multiplying the local shift quantity and the weighting value of the each pixels.

* * * * *